(12) United States Patent
Mossakowski

(10) Patent No.: US 7,369,154 B2
(45) Date of Patent: May 6, 2008

(54) METHOD FOR TRANSMITTING ADDITIONAL DATA WITHIN A VIDEO TRANSMISSION

(75) Inventor: Gerd Mossakowski, Ahlen (DE)

(73) Assignee: T-Mobile Deutschland GmbH, Bonn (DE)

( * ) Notice: Subject to any disclaimer, the term of this patent is extended or adjusted under 35 U.S.C. 154(b) by 316 days.

(21) Appl. No.: 10/520,423

(22) PCT Filed: Jul. 8, 2003

(86) PCT No.: PCT/DE03/02284

§ 371 (c)(1),
(2), (4) Date: Dec. 7, 2005

(87) PCT Pub. No.: WO2004/008766

PCT Pub. Date: Jan. 22, 2004

(65) Prior Publication Data

US 2006/0215015 A1    Sep. 28, 2006

(30) Foreign Application Priority Data

Jul. 10, 2002    (DE) ................ 102 31 286

(51) Int. Cl.
*H04N 7/14* (2006.01)
(52) U.S. Cl. ................ 348/14.12; 348/14.01
(58) Field of Classification Search ........ 348/14.12, 348/14.01, 14.13, 390.1, 420.1, 423.1
See application file for complete search history.

(56) References Cited

U.S. PATENT DOCUMENTS 5,973,745 A * 10/1999 Kondo .............. 348/420.1

6,008,847 A    12/1999 Bauchspies

FOREIGN PATENT DOCUMENTS

| DE | 692 26 825 T2 | 1/1993 |
|---|---|---|
| DE | 195 41 457 C1 | 11/1995 |
| DE | 693 24 538 T2 | 10/1999 |
| DE | 694 25 047 T2 | 10/2000 |
| DE | 696 10 987 T2 | 5/2001 |
| DE | 695 19 462 T2 | 6/2001 |
| DE | 101 13 880 A1 | 10/2002 |
| EP | 1 120 968 A1 | 8/2001 |
| EP | 1 331 820 A1 | 7/2003 |
| WO | WO 98 19273 | 5/1998 |
| WO | WO 02 35848 A | 5/2002 |

OTHER PUBLICATIONS

Simon S "Generalized Run-Length Coding for SNR-scalable Image Compression" Signal Processing: Theories and Applications, Proceedings of Eusipco, (Sep. 13, 1994) pp. 560-563.

* cited by examiner

*Primary Examiner*—Stella Woo
(74) *Attorney, Agent, or Firm*—Browdy & Neimark

(57) ABSTRACT

The invention relates to a method for transmitting additional data within a video data transmission between a transmitter and a receiver according to the prioritized pixel transmission method, wherein the video data consist of individual pixel groups, and each pixel group has a position value within an image array and has at least one pixel value, wherein the minimum size of the image array is defined by the height h and width b of a video image, given in picture elements. The invention is characterized in that during the transmission of the additional data, position values are used that do not occur in the actual video data but are assigned to an offset range of the image array.

20 Claims, No Drawings

METHOD FOR TRANSMITTING ADDITIONAL DATA WITHIN A VIDEO TRANSMISSION

The invention relates to a method for transmitting additional data within a video data transmission according to the preamble of claim 1.

In order to be able to transmit video data smoothly over a communication channel, high transmission bandwidths are required. Especially in the case of mobile communications networks, however, only limited bandwidths are available. In the case of the transmission and real-time playback of a video, e.g., on the display of a wireless communications terminal or mobile computer, a low bandwidth becomes noticeable especially during quick scene changes, in such a way that the scenes can no longer be reproduced smoothly.

According to the prior art, video signals are recorded and played back in a fast sequence of individual images. In the case of television (e.g., PAL standard), this is 25 frames per second or 50 half-frames. In the case of digital recordings, this can be up to 30 images per second. During the transmission, each image is separated into lines and transmitted sequentially to a receiver where it is re-assembled into an image.

Known compression methods are essentially based on decreasing the resolution and reducing of the number of images (to be stored or transmitted) per second. In the case of the digital compression, the difference images, i.e., only differing image information between successive images, are transmitted instead of complete images.

The latest standard for video coding is MPEG4.

Even in the case of MPEG4, a scene change requires a complete new image to be transmitted, proceeding from which difference frames can then again be transmitted. If only a small bandwidth is available, a certain amount of time is generally needed to transmit the complete image. In the case of low transmission rates, this time may be in the range of up to several seconds. To have an image transition take place during this time that is uninterrupted to the human eye, the last transmitted image is displayed until the new image has been completely transmitted. The viewer perceives this short halting of the video, the so-called jerking, as if he was using the video recorder's freeze-frame function.

In order to be able to display, e.g., in the case of video conferencing systems, multiple scene images simultaneously without jerking, separate transmission channels are opened for each scene, if possible.

The invention has as its object to specify a method for transmitting additional data within a video data transmission that permits especially a smooth video transmission even in the case of low transmission bandwidths.

This object is met according to the invention with the characteristics of claim 1.

The inventive method has as its basis the method for compressing and decompressing video data by means of prioritized pixel transmission, which is described in the German patent application DE 101 13 880.6 (corresponds to PCT/DE02/00987) and whose revelation shall be fully incorporated into the revelation of the present invention. In this method, a preferably parallel processing of the video information takes place in the video recording chip. The parallel processing serves the purpose to first determine the most important pixels and to store them according to a priority allocation in a priority array. This array contains, at each moment in time, the pixel values sorted according to the priority allocation. In accordance with this priority allocation, these pixels and the pixel values that have been used to calculate the priority allocation are transmitted and saved. A pixel receives a high priority if the differences in relation to its neighboring pixels are great. The pixels are transmitted in pixel groups, whose position in an image array is determined by means of position values.

For the reconstruction of the video image, the current pixel values in each case are reproduced on the display. The pixels that have not yet been transmitted are calculated from the pixels that have already been transmitted. Depending on the computing power, transmission bandwidth, and size of the display, different methods may be used to calculate the pixels that have not yet been transmitted. If a very large bandwidth is available, a simple linear interpolation may be performed. If only a very small bandwidth is available, this may be taken into account for the transmission of the prioritized pixels.

In accordance with the invention, position values, which do not occur in the actual video data but which are assigned to an offset range of the image array, are used for the transmission of the additional data.

Advantageous further developments and improvements of the invention are specified in the dependent claims.

Each pixel group is transmitted with a position value that characterizes the position of the pixel group in each image. Each image consists of an image array of picture elements that is defined by the values height h×width h, given in each case in picture elements (pixels).

Proceeding from the simple example described in patent application DE 101 13 880.6, in the case of an image height h of 21, for example, and an image width b of 20 picture elements, position values between 0 . . . 419 are obtained for the pixel groups.

A new image scene would start at position value 420 and end at 839.

According to the invention, the transmission of a new image does not start at position value 420, but offsets are now used so that it becomes possible to transmit already in advance, for example, information from other scenes. The offset, in this case, must amount to at least the value height x width of an image. An offset whose size=n×width b×height h, can be used to transmit information from different scenes in advance. Switching to a scene with a certain offset may take place by transmission of a position value that lies within the value range of the offset and thus does not occur or cannot occur in any of the scenes. The method principle shall be illustrated with the aid of a simple example.

EXAMPLE

Image width b: 20 picture elements (pixels)
Image height h: 21 picture elements
Minimal offset=image width b×image height h=20×21=420.

This would result in a minimum offset of 420. In order to obtain an optimal performance, it is advisable to give the maximum offset a value of $2^n$, wherein n is a natural number. In this case n=9 would present itself, since this amounts to $2^9$=512.

The position values between 420 and, for example, 512, can now be used for the transmission of additional information, i.e. for an inline signaling. By means of the inline signaling, the time positions of scene changes can be transmitted, for example.

In the above-described example, different scenes can be uniquely assigned to the position values. This method can also be used to transmit multiple scenes in parallel, which is helpful, for example, for video conferencing systems in order to reproduce, for example, multiple camera images at the same time, e.g., camera 1=overview camera in the conference room, camera 2=camera on current speaker, camera 3=document camera, etc.

EXAMPLE

| Scene Range | Scene | Video Range | Inline Signaling Range (Offset Range) |
|---|---|---|---|
| 0 . . . 512 | 1 | 0 . . . 419 | 420 . . . 512 |
| 513 . . . 1024 | 2 | 513 . . . 932 | 933 . . . 1024 |
| 1025 . . . 1536 | 3 | 1025 . . . 1444 | 1445 . . . 1536 |

The advantages as compared to the prior art, due to the prioritizing pixel transmission, initially consist of the advantages described in patent application DE 101 13 880.6, which, among other things, consist in that an adaptive compression of the video image data to the existing transmission bandwidth and image resolution of the utilized terminal equipment becomes possible.

A scene change that is transmitted in advance permits, especially in the case of low bandwidths, the new scene to be displayed without noticeable delay.

The inline signaling does not cause as much overhead that it would require the opening of individual transmission channels for multiple cameras (e.g., video conferencing system).

By means of the inline signaling, synchronization between the video data and additional data is also ensured at all times.

What is claimed is:

1. A method for transmitting additional data within a video data transmission between a transmitter and a receiver according to the prioritized pixel transmission method, wherein the video data consists of individual pixel groups, and each pixel group has a position value within an image array and has at least one pixel value, wherein the minimum size of the image array is defined by the height h and width b of a video image, given in picture elements, characterized in that during the transmission of the additional data, position values are used that do not occur in the actual video data but are assigned to an offset range of the image array.

2. A method as set forth in claim 1, characterized in that the offset range starts at a position value h×b.

3. A method as set forth in claim 1, characterized in that the offset range ends at a position value $2^n >= h \times b$, wherein n is a natural number.

4. A method as set forth in claim 1, characterized in that the video data is transmitted with position values of <h×b and the additional data is transmitted with position values of >=h×b.

5. A method as set forth in claim 1, characterized in that based on the additional data, video data from other scenes is transmitted in advance.

6. A method as set forth in claim 1, characterized in that based on the additional data, scene change time positions are transmitted.

7. A method as set forth in claim 1, characterized in that the additional data is transmitted in the form of pixel groups.

8. A method as set forth in claim 1, characterized in that the pixel groups are assigned priorities in dependence upon their content-based, time-based or equipment-based relevance.

9. A method as set forth in claim 1, characterized in that the pixel groups are transmitted in descending order of their priority.

10. A method as set forth in claim 1, characterized in that the additional data in the receiver is recognized based on its position values.

11. A method as set forth in claim 1, characterized in that the scenes are identified at the recipient's with the aid of their allocated position values.

12. A method as set forth in claim 2, characterized in that the offset range ends at a position value $2^n >= h \times b$, wherein n is a natural number.

13. A method as set forth in claim 2, characterized in that the video data is transmitted with position values of <h×b and the additional data is transmitted with position values of >=h×b.

14. A method as set forth in claim 2, characterized in that based on the additional data, video data from other scenes is transmitted in advance.

15. A method as set forth in claim 2, characterized in that based on the additional data, scene change time positions are transmitted.

16. A method as set forth in claim 2, characterized in that the additional data is transmitted in the form of pixel groups.

17. A method as set forth in claim 2, characterized in that the pixel groups are assigned priorities in dependence upon their content-based, time-based or equipment-based relevance.

18. A method as set forth in claim 2, characterized in that the pixel groups are transmitted in descending order of their priority.

19. A method as set forth in claim 2, characterized in that the additional data in the receiver is recognized based on its position values.

20. A method as set forth in claim 2, characterized in that the scenes are identified at the recipient's with the aid of their allocated position values.

* * * * *